(12) United States Patent
Das et al.

(10) Patent No.: US 10,685,268 B1
(45) Date of Patent: Jun. 16, 2020

(54) METHODS AND SYSTEMS FOR LOGICAL CELL BASED ORIENTATION IN N-UP COPYING OR PRINTING

(71) Applicant: XEROX CORPORATION, Norwalk, CT (US)

(72) Inventors: Arindam Das, Konnagar (IN); Sainarayanan Gopalakrishnan, Chennai (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/247,657

(22) Filed: Jan. 15, 2019

(51) Int. Cl.
*G06K 15/02* (2006.01)
*H04N 1/393* (2006.01)
*H04N 1/387* (2006.01)

(52) U.S. Cl.
CPC ....... *G06K 15/1889* (2013.01); *H04N 1/3871* (2013.01); *H04N 1/3935* (2013.01)

(58) Field of Classification Search
None
See application file for complete search history.

(56) References Cited

U.S. PATENT DOCUMENTS

2007/0070374 A1* 3/2007 Boyes, Jr. ............. G06F 3/1204
358/1.13
2014/0268185 A1* 9/2014 Gopalakrishnan ..........................
G06K 15/1848
358/1.2

* cited by examiner

*Primary Examiner* — Dov Popovici

(57) ABSTRACT

Embodiments of the present disclosure include methods and systems for altering an orientation of a logical cell at a multi-function device. In one embodiment, before rasterization, a user submits a job having multiple pages and an initial instruction to arrange 'n' number of pages on a single medium. Each page has a pre-defined orientation. Another instruction is received to alter a pre-defined orientation of a selected page in the corresponding logical cell. An N-up operation is performed to arrange the 'n' number of pages on the single medium. Each page arranged on the single medium represents a logical cell. While performing the N-up operation, the pre-defined orientation of a logical cell corresponding to the selected page is altered. The logical cell with the altered orientation is printed and the remaining logical cells with respective pre-defined orientation are printed on the single medium.

31 Claims, 7 Drawing Sheets

METHODS AND SYSTEMS FOR LOGICAL CELL BASED ORIENTATION IN N-UP COPYING OR PRINTING

TECHNICAL FIELD

The present disclosure relates generally to image processing and more particularly to methods and systems for logical cell based orientation in N-up copying or printing operation.

BACKGROUND

Many modern printing devices have an environment-friendly feature that is referred to as "multi-up," "N-up," or "N-in-1" copying or printing. In N-up printing, 'N' document pages are printed on a single designated print medium using the conventional image forming systems. This technology of copying or printing or copying 'N' document pages on a single designated medium ("N-up copying or printing") provides environmental advantages by using less paper and toner/ink. In an example, the print medium can be a sheet or a paper on which the document pages are printed.

In this "N-up" copying or printing, 'N' is a positive integer equal to or larger than 2 and represents the number of full-size pages that are printed on a single designated print medium. For example, 2-up printing prints two original pages on one designated print medium. Similarly, 4-up printing prints four original pages on one designated print medium, 6-up printing prints six pages on one designated print medium, and the like.

However, in N-up copying or printing of multiple document pages having various sizes and/orientations, it sometimes occurs that size and/or orientation of one of the pages does not fit into an allocated surface area on a designated print medium, causing an inappropriate and unacceptable processing of N-up copying or printing. Sometimes requirements arise to change the orientation of a page while performing N-up or at later stages. Till date, there are no methods and systems available to change the orientation of one or more pages in N-up printing or copying or at later stages. Therefore, there is a need for efficient methods and systems.

SUMMARY

This summary is provided to introduce concepts related to logical cell-based orientation in N-up copying or printing. The concepts are further described below in the detailed description. This summary is not intended to identify key features or essential features of the claimed subject matter, nor is it intended to be used to limit the scope of the claimed subject matter.

According to aspects illustrated herein, a method for altering an orientation of a logical cell at a multi-function device is disclosed. The method includes receiving a job including multiple pages and an initial instruction to arrange 'n' number of pages on a single medium, wherein each page has a pre-defined orientation. Then, another instruction to alter a pre-defined orientation of a selected page in the corresponding logical cell, is received. Thereafter, an N-up operation is performed to arrange 'n' number of pages on the single medium, wherein each page arranged on the single medium represents a logical cell. While performing the N-up operation, the pre-defined orientation of a logical cell corresponding to the selected page is altered. Then, rasterization is performed to convert each logical cell into ready-to-print format. Finally, the logical cells are printed on the single medium. Printing the logical cells on the single medium includes printing the logical cell with the altered orientation and printing the remaining logical cells with respective pre-defined orientation.

According to further aspects illustrated herein, a method for altering an orientation of a logical cell at a multi-function device, is disclosed. The method includes providing a user interface to receive a selection of a stored N-up raster buffer corresponding to a document, the N-up raster buffer includes 'n' number of logical cells on a single medium, wherein each logical cell is associated with a tag value and has a defined orientation; display the 'n' number of logical cells with respective defined orientation; receive a selection of a logical cell for altering an orientation; and receive orientation details for the selected logical cell. Then, pixels corresponding to the selected logical cell are identified, based on the tag value. Upon identification, the orientation of the selected logical cell is altered by rotating the pixels of the selected logical cell based on the orientation details. Then, the updated N-up raster buffer is stored with the altered orientation of the selected logical cell and the remaining logical cells with respective defined orientation, for later retrieval and/or use. Finally, the updated N-up raster buffer is printed. Printing the updated N-up raster buffer includes printing the selected logical cell with the altered orientation and printing the remaining logical cells with respective defined orientation.

A multi-function device is disclosed. The multi-function device includes a receiver, a raster image processor and a print engine. The receiver is for receiving a job includes multiple pages and an initial instruction to arrange 'n' number of pages on a single medium, wherein each page has a pre-defined orientation; and receiving another instruction to alter a pre-defined orientation of a selected page in the corresponding logical cell. The raster image processor is for performing an N-up operation to arrange 'n' number of pages on the single medium, wherein each page arranged on the single medium represents a logical cell; while performing the N-up operation, altering the pre-defined orientation of a logical cell corresponding to the selected page; and performing rasterization to convert each logical cell into ready-to-print format. The print engine is for printing the logical cells on the single medium, includes printing the logical cell with the altered orientation and printing the remaining logical cells with respective pre-defined orientation.

A multi-function device is disclosed. The multi-function device includes a user interface for receiving a selection of a stored N-up raster buffer corresponding to a document, the N-up raster buffer includes 'n' number of logical cells on a single medium, wherein each logical cell is associated with a tag value and has a defined orientation; displaying the 'n' number of logical cells with respective defined orientation; receiving a selection of a logical cell for altering an orientation; and receiving orientation details for the selected logical cell. The raster image processor is for identifying pixels corresponding to the selected logical cell, based on the tag value; and upon identification, altering the orientation of the selected logical cell by rotating the pixels corresponding to the selected logical cell based on the orientation details. The print engine is for printing the selected logical cell with the altered orientation and printing the remaining logical cells with respective defined orientation.

Other and further aspects and features of the present subject matter will be evident from the following detailed description of the exemplary implementations, which are intended to illustrate, not limit, the present disclosure.

BRIEF DESCRIPTION OF DRAWINGS

The illustrated embodiments of the present disclosure will be best understood by reference to the drawings, wherein like parts are designated by like numerals throughout. The following description is intended only by way of example, and simply illustrates certain selected embodiments of devices, systems, and processes that are consistent with the subject matter as claimed herein, wherein:

DETAILED DESCRIPTION

Figure 1A:
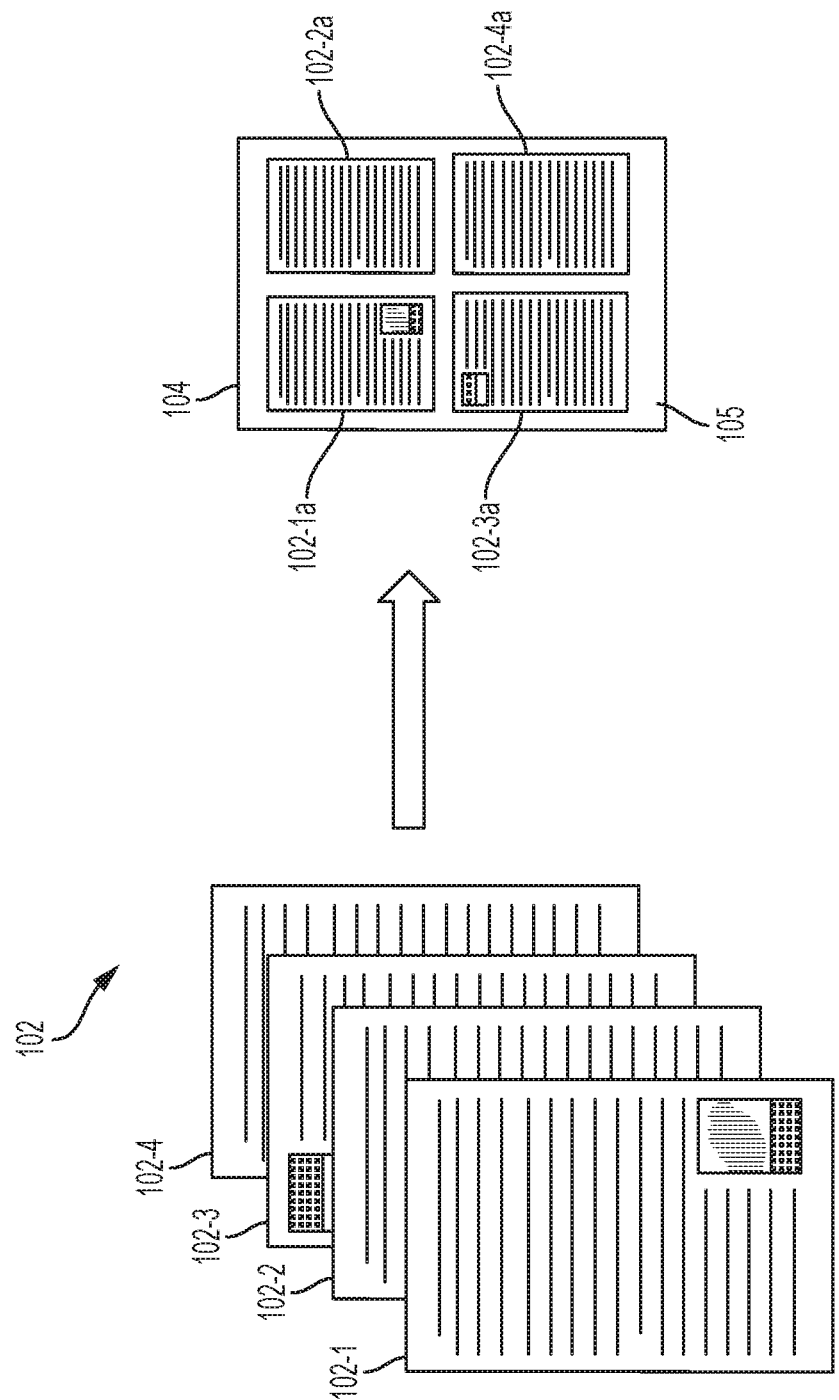
FIG. 1A illustrates aspects of N-up operation, in an exemplary implementation of the present disclosure.

A few aspects of the present disclosure are explained in detail below with reference to the various figures. Example implementations are described to illustrate the disclosed subject matter, not to limit its scope, which is defined by the claims. Those of ordinary skill in the art will recognize a number of equivalent variations of the various features provided in the description that follows.

Non-Limiting Definitions

In the disclosure hereinafter, one or more terms are used to describe various aspects of the present disclosure. For a better understanding of the present disclosure, a few definitions are provided herein for better understating of the present disclosure.

The term "N-up operation is to arrange 'n' document pages on a single designated medium, the N-up operation may include an N-up printing operation or an N-up copying operation. When an N-up job is submitted for printing is referred to as N-up print job. Like printing, when an N-up job is submitted for copying, it is referred to as N-up copy job. In N-up copy job, a user does not require to submit any document in physical form but can only create copy from the submitted document such as PDL.

"Logical cells" refer to logical sections created on a surface of a single designated medium to receive separate individual document images in N-up printing or copying operation. The logical cells may be termed as logical surfaces, logical pages, and so on.

"Orientation" refers to the direction in which a page is stored, displayed, viewed or printed. The two types of page orientation are portrait (vertical) and landscape (horizontal).

The term "Single Medium" includes any media selected by the user for N-up printing or copying. The single medium in case of N-up print job may be a single sheet or a paper of sizes such as A4, A3 and so on. In case of N-up copy job, the single medium refers to a logical surface of the sheet. The single medium may be termed as designated medium.

The term "Document" refers to a document submitted to a multi-function device for N-up printing or copying. The document is transmitted in the form of page description language (PDL) document such as PostScript (PS), Portable Document Format (PDF) and Extensible Markup Language (XML) Paper Specification (XPS).

The term "User device" includes, but not necessarily limited to, hardware, software, or a combination thereof that accesses a server. Examples include, but are not limited to, a computing device, a phone, a tablet, a personal digital assistant, a laptop and so on.

"Multi-function device" refers to a device or a combination of multiple devices configured to perform one or more functions, but not limited to, scanning, printing, copying, imaging, and so forth. The multi-function device includes software, hardware, firmware, or combination thereof. In the context of the current disclosure, the multi-function device includes one or more modules for altering an orientation of one or more logical cells before rasterization and post rasterization. More details on the same will be discussed below. The multi-function device may be a printer, a copier, a multi-functional printer, a multi-functional peripheral device and so on.

"Computer-readable medium" or "storage medium" may be a physical medium that can store data. Examples of "computer-readable medium" may include a magnetic medium such as diskettes, floppy disks, and tape; an optical medium such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be storage medium.

Overview

In copying and printing technologies, performing N-up operation refers to an arrangement of multiple document pages onto a single medium. The N-up operation may be N-up printing or N-up copying operation. In N-up printing, "n" refers to the number of "logical cells" composited onto a single print medium. For example, 2-up printing refers to a page layout where 2 logical cells are arranged and printed onto a single sheet. The term logical cell refers to a page having information after cutting, and/or binding operation. While a physical page contains one or more logical cells that appears on one side of a sheet. In N-up printing operation, printable information contained in document pages is divided into sections suitable to fit onto the single print medium such as a paper. As a result, a surface of the print medium is divided into sections suitable to receive separate individual document images. These sections are referred to as logical cells. The logical cell may be scaled for N-up copying or printing and further may also be referred to as a "sub-page" of an output page (print medium). The N-up operation can be performed by a processing device under the direction of one or more software programs.

While performing N-up printing of a PDL job, the scaling and orientation of each document page are kept the same in corresponding logical cell as in the received job. It may be a case where document pages of the PDL are wrongly oriented or rotated during scanning or saving in such a manner that the N-up printing becomes inappropriate or unacceptable. For example, if a web page is saved in a landscape orientation and in case a user wishes to perform N-up printing of that web page with other pages having a portrait orientation, the N-up printing of that web page becomes inappropriate or unacceptable as other web pages may be printed in portrait orientation by default. In such cases, there seems a requirement to change the orientation of that web page with landscape orientation. There may be other requirements where the user wishes to change or modify orientation of one or more pages of the job submitted by the user or at later stages.

To cater to the user requirements, the present disclosure provides methods and systems for altering an orientation of one or more logical cells of an N-up job any time after submitting the job. In an example, the methods and systems alter the orientation of one or more pages in the corresponding logical cells, before rasterization take place. In such scenarios, the user can specify the orientation as a part of the job when submitting the job or the user can specify the orientation via a user interface. Based on the user input, the orientation of a logical cell corresponding to the selected page is set before rasterization takes place.

In another example, the methods and systems alter the orientation of one or more logical cells after rasterization is already performed, i.e., altering orientation of the already RIP-ed pages/content. In such scenarios, the methods and systems display logical cells for selections via a user interface and further alters the orientation of the logical cells.

The disclosure further includes a way to rotate more than one logical cell at a time.

Exemplary Environment and Multi-function Device

It should be noted that the description and the figures merely illustrate the principles of the present disclosure along with examples described herein and should not be construed as a limitation to the present subject matter. It is, thus, understood that various arrangements may be devised that, although not explicitly described or shown herein, embody the principles of the present subject matter. Moreover, all the statements herein reciting principles, aspects, and implementations of the present disclosure, as well as specific examples thereof, are intended to encompass equivalents thereof.

The present disclosure is discussed with respect to N-up printing as an example for easy understanding. But it is understood the disclosure can be extended to N-up copying scenarios. In printing scenarios, the output is in the form of printed papers, while the output is in the form of a digital copy in copying scenarios. The disclosure is further discussed with respect to altering an orientation of a single logical cell, however, the disclosure is applicable to altering orientation of more than one logical cell.

FIG. 1A shows aspects of N-up operation, illustrating an exemplary input document 102 in N-up operation and an output document 104. The input document 102 is submitted for printing or copying in N-up printing or N-up copying mode, respectively. A user may select a print option for printing the document 102 or similarly the user may select a copy option for copying the document 102. As shown, the input document 102 includes multiple pages 102-1, 102-2, 102-3, and 102-4 (collectively referred to as 102 hereinafter). It can be considered that the user selects a print option to print the pages 102 using the N-up printing option. Then, the pages 102 are printed on respective logical cells created on a single designated print medium. The pages 102 can be scaled appropriately so that the pages 102 fit adequately in respective logical surfaces/cells on the single designated print medium. Once the pages 102 are scaled to the respective logical cells, the pages 102 are printed on the single print medium 105 such as a paper. The printed output is represented as output document 104, i.e., an N-up output document including multiple logical cells such as 102-1a, 102-2a, 102-3a, and 102-4a arranged on the single medium 105. The logical cell 102-1a corresponds to the original page 102-1, the logical cell 102-2a corresponds to the original page 102-2, the logical cell 102-3a corresponds to the original page 102-3 and, the logical cell 102-4a corresponds to the original page 102-4. In this way, there is a one-to-one correspondence/mapping between each of the pages 102-1, 102-2, 102-3, and 102-4 and their corresponding logical cells 102-1a 102-2a, 102-3a, and 102-4a respectively.

The input document 102 may be in the form of a page description language (PDL) document such as PostScript (PS), Portable Document Format (PDF), Extensible Markup Language (XML) Paper Specification (XPS) and so on. The PDL document 102 may include instructions/information about N-up operation and may further include information about fonts, graphics, and the like that describe the appearance of the input document 102 and may include a set of programming language commands or specifications for processing the pages 102 based on the information. One exemplary type of command may include to perform "N-up printing". The letter "n" represents the number of logical cells that are to be scaled (if necessary) and printed onto the single medium.

The input document 102 may be submitted by the user via a computing device, a document reader, a gateway, or Internet browsers. The input document 102 may be uploaded by the user. The input document 102 may be selected via a memory of a device such as a multi-function device 150 (refer to FIG. 1B). The input document 102 may be a scanned document obtained after scanning. The scanned document may include scanned pages that are rotated and requires modification in such cases the N-up becomes inappropriate and unacceptable.

As indicated in the input document 102, orientation of each page 102-1, 102-2, 102-3 and 102-4 is landscape (horizontal) and orientation of corresponding logical cell 102-1a, 102-2a, 102-3a, and 102-4a is landscape. The input document 102 and the output document 104 shown in FIG. 1A simply outlines N-up operation and orientation change in logical cells according to the implementation of the present disclosure are discussed in detail below.

The N-up job may be an N-up print job or an N-up copy job. For example, if there is a 4-up print job, then, four logical cells are created on the single print medium. In case of 4-up copy job, four logical cells are created on a logical surface of the single medium. However, other values of 'N' can be used in various embodiments, such as 2, 3, 6, 8, 10, or the like. Here, "n" number is a positive integer equal to or larger than 2 and represents a number of full-size pages that are to be printed on the single print medium.

Figure 1B:
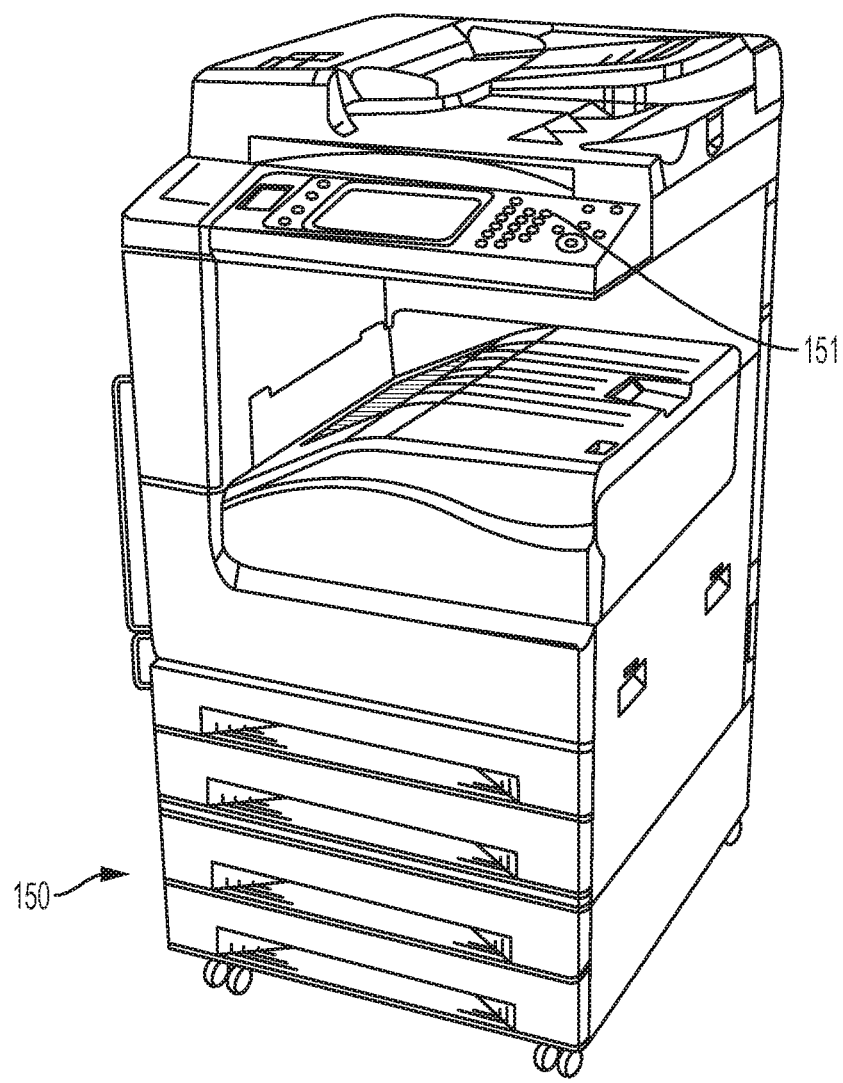
FIG. 1B shows a physical real multi-function device.
Figure 2:
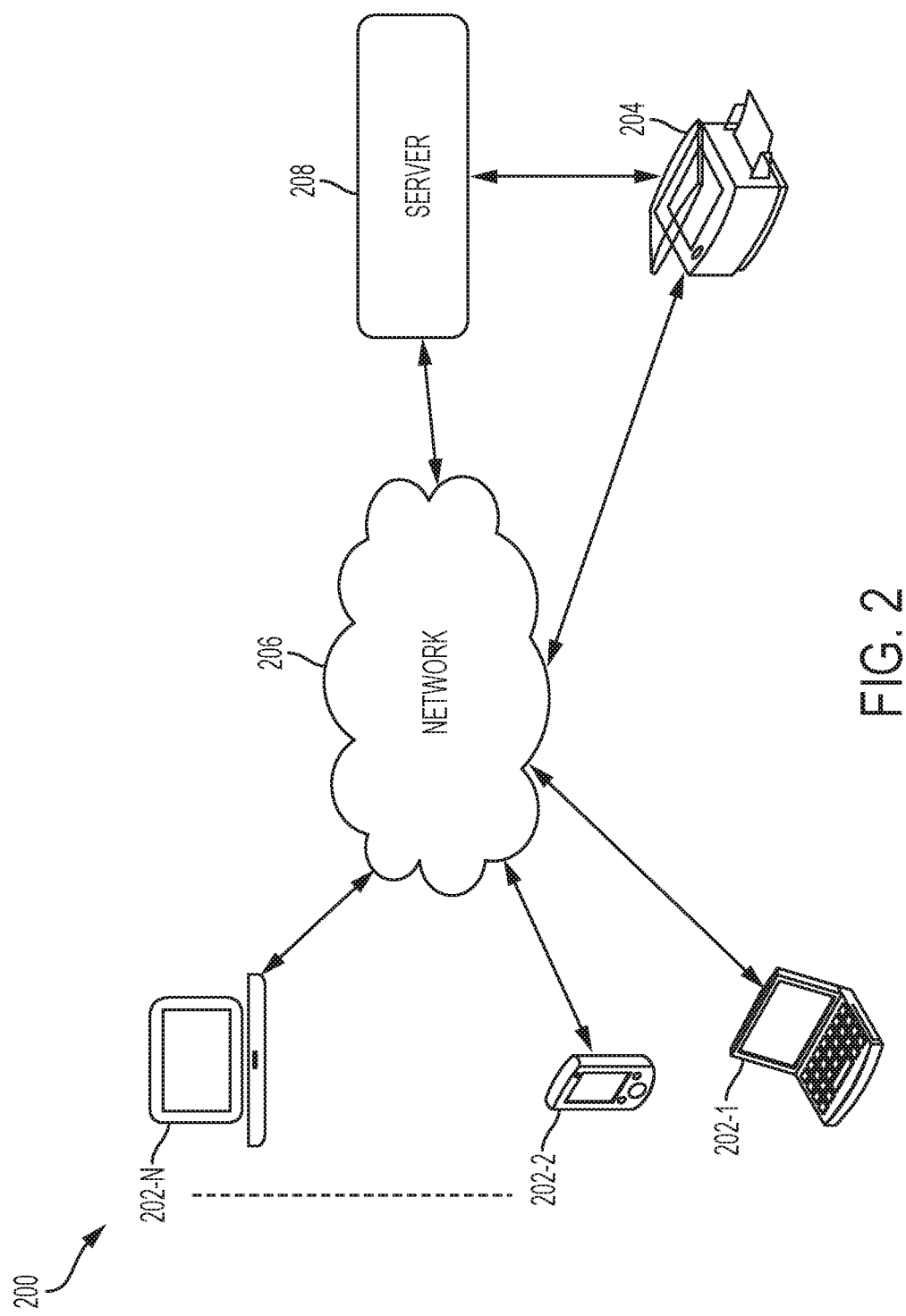
FIG. 2 illustrates an exemplary network in which various inventive techniques and systems can be employed in an exemplary implementation of the present disclosure.

FIG. 1B shows an exemplary physical multi-function device 150 typically used for day-to-day functions such as printing, scanning, copying, imaging, and so on. As shown, the multi-function device 150 is a standalone device, but the multi-function device 150 may be a part of network communicatively coupled to other devices as shown in FIG. 2. In place of the multi-function device 150, the disclosure may include a printer, a copier, a multi-function peripheral device, a multi-function printer and so on. In context of the present disclosure, the multi-function device 150 receives a job including the input document 102 to be processed in N-up mode along with instructions to process the document. For example, the instructions may relate to N-up printing or copying. Based on the received document and the N-up instructions, the multi-function device 150 performs N-up operation to arrange multiples pages on a single page, performs rasterization on the logical cells (i.e., creates an N-up raster buffer), associates each logical cell with original page of the job and successfully performs N-up operation. The output includes a single printed sheet with 4 logical cells arranged on the single sheet. Each logical cell may be named as LC1, LC2, LC3 and LC4.

In context of the current disclosure, the multi-function device 150 receives additional instructions or information about changing orientation of one or more pages of the job or one or more logical cells. Based on the received instructions, the multi-function device 150 alters orientation of the one or more logical cells. The multi-function device 150 alters orientation of the one or more logical cells before rasterization and/or after rasterization. In before rasterization scenario, the job is in the form of a PDL document not yet rasterized by the multi-function device 150. In post rasterization scenario, the job is in the form of an N-up raster buffer available with the multi-function device 150. In the former case, the user submits or inputs the one or more pages requiring orientation change, the one or more pages indicate actual physical pages of the job. In the latter, the user submits or selects one or more logical cells requiring orientation change.

In before rasterization scenario, the user submits the job to the multi-function device 150 through any known ways or later developed ways. The user further provides one or more pages for which orientation change is required and further submits orientation details through the user interface 151 or as a part of the job. For example, the orientation details may include degree of change, direction of change, and so on. Specifically, the orientation details include degree of rotation and direction of rotation. The multi-function device 150 receives the job, the one or more pages requiring the orientation change, orientation details and other relevant information for processing. Based on the received information, the multi-function device 150 performs N-up operation to arrange multiple pages on a single medium, each page arranged on the single medium represents a logical cell. The multi-function device 150 then checks if any logical cell requires an orientation change. Based on the check, the multi-function device 150 identifies a logical cell corresponding to the page selected/submitted for orientation change and changes the orientation of the identified logical cell. The multi-function device 150 then performs rasterization, i.e., creates an N-up raster buffer having raster images/all pixels of each logical cell. The multi-function device 150 generates and assigns a tag value to all pixels falling under a particular logical cell to identify the logical cells. The tag value helps identify which pixels belong to which logical cell. Finally, the multi-function device 150 performs printing, where the identified logical cell is printed with the altered orientation and the remaining logical cells are printed with pre-defined orientation/original orientation.

In after rasterization scenario, the rasterization of the job is already performed, meaning that the N-up raster buffer is ready and stored with the multi-function device 150. The user selects an N-up raster buffer corresponding to the job. The N-up raster buffer contains raster images/all pixels of each logical cell. The multi-function device 150 retrieves the N-up buffer and displays logical cells to the user through the user interface 151 for selection. The user selects one or more logical cells requiring an orientation change and orientation details through the user interface 151. For example, the orientation details may include degree of change, direction change, and so on. The user can select the logical cells based on the tag value displayed to the user and so on. The multi-function device 150 receives the logical cells selection and orientation details through the user interface 151. Based on the received information, the multi-function device 150 identifies the logical cells requiring the orientation change and changes orientation of the identified logical cell. Specifically, the multi-function device 150 identifies pixels corresponding to the identified logical cell based on the tag value and performs rotation only of the pixels falling under the identified logical cell. Finally, the multi-function device 150 alters the orientation of the identified logical cell. The multi-functional device 150 prints the logical cells with altered orientation and prints the remaining logical cells with the original orientation. In some cases, the multi-functional device 150 displays the logical cells with altered orientation and displays the remaining logical cells with the original orientation.

In this manner, the multi-function device 150 alters the orientation of the logical cells before rasterization as well as post rasterization. More details of the component of the multi-function device 150 are discussed in FIG. 3.

Figure 4:
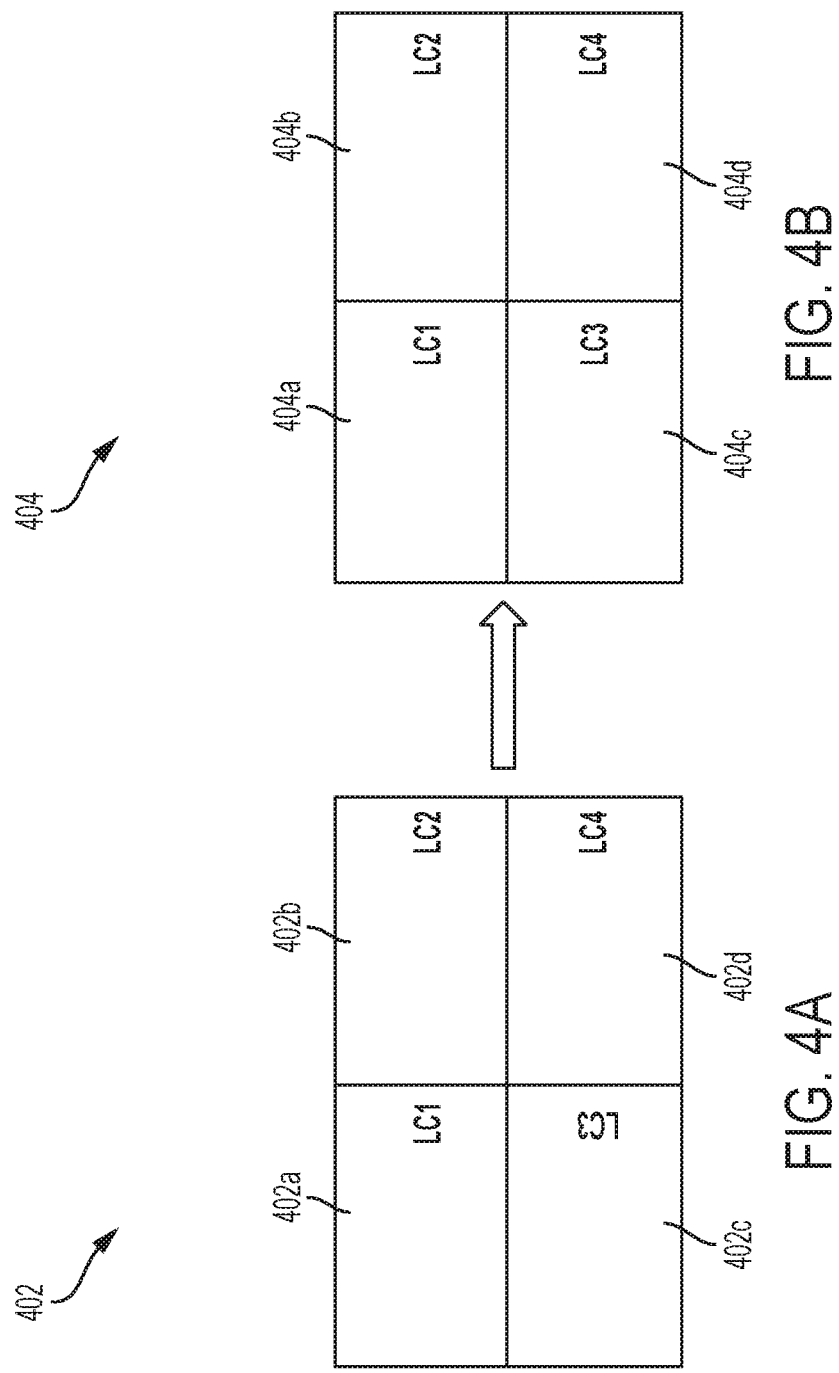
FIGS. 4A-4B illustrate an exemplary implementation of the N-up copying or printing process, according to an exemplary embodiment of the present disclosure.

One such implementation of the present disclosure is shown in FIGS. 4A and 4B. FIG. 4A shows a 4-up document 402 where 4 logical cells LC1 402a, LC2 402b, LC3 402c and LC4 402d are arranged on a single sheet. The 4-up document 4022 is an output with original orientation as in the input document (although not shown). LC1 402a indicates logical cell 1, LC2 402b represents logical cell 2, LC3 402c represents logical cell 3 and LC4 402d represents logical cell 4. LC1 402a, LC2 402b and LC4 402d represents logical cells in landscape orientation, while LC3 402c is a logical cell with landscape orientation but in a different direction. According to the implementation of the present disclosure, the user specifies that he wishes to change the orientation of the logical cell LC3 402c. As a result, user specifies the required orientation of the logical cell LC3 such as 90 degree rotation, clockwise direction (right direction) via the user interface 151. Based on the user specified orientation, the multi-function device 150 outputs the N-up document according to the implementation of the present disclosure. The output N-up document 404 includes all logical cells LC1 404a, LC2 404b, and LC4 404d in the landscape orientation and outputs the logical cell LC3 404c with the altered orientation. The logical cell LC3 404c is rotated 90 degree in clockwise direction according to the user specified input as seen in FIG. 4B. Now, all logical cells 404a-404d are in the same orientation. In this manner, the orientation of the logical cell is modified or corrected as per user choice.

The multi-function device 150 may be a home multi-function device, an office multi-function device, a business multi-function device, a production multi-function device capable of rapid production of large volumes of documents, without limiting the scope of the disclosure.

The orientation of the logical cells can be altered as per user choice. The "before rasterization" scenario can be implemented when the user submits the job for printing or copying and knows which page (or corresponding logical cell) requires orientation change. The post rasterization scenario can be implemented when a job is already processed, and N-up raster of the job is saved for later retrieval and/or use. In such scenarios, the user may realize later that he wishes to further change the orientation of the one or more logical cells.

FIG. 2 illustrates, as an example, a network environment 200 for network printing of electronic documents, according to an example of the present disclosure. The network environment 200 includes a plurality of user devices 202-1, 202-2, . . . , 202-N, hereinafter collectively referred to as user devices 202 and individually as user device 202. Examples of the user devices 202 may include, but are not limited to, workstations, personal computers, personal digital assistants (PDAs), laptop computers, notebooks, smartphones, smart cameras, smart television sets, and other smart devices.

The network environment 200 can include a plurality of multi-functional devices out of which one multi-functional device 204 is shown for the sake of simplicity. In an example, the multi-functional device 204 and the user devices 202 are connected over a network 206 directly or through a server 208 via wired, wireless, optical, or other types of network connections. The server 208 can be a file server, an email server, a database server, a print server, or any other type of network server.

The network 206 may be a single network or a combination of multiple networks. The network 206 may include one or more area networks, such as a local area network (LAN), a wide area network (WAN), an intranet, the internet, or any other type of network. In an example, the network 206 may include a mobile communication network, for example, 2G, 3G or 4G mobile communication network. Although only a few devices are shown coupled to network 206, a typical network may have tens or hundreds of devices coupled to one another. Furthermore, network 206 may be coupled to one or more other networks, thereby providing coupling between a greater number of devices. Such can be the case, for example, when networks are coupled together via the Internet.

In an example, a user of the user device 202-2 logins to a network printing service offered by the multi-functional device 204. The user can log in from the user device 202-2 present anywhere in the network 206, for submission of a print job to the multi-functional device 204. Further, for submission of the print job, the user device 202-2 can facilitate the user to access a web portal of the network printing service. In an example, the user may access the web portal by selecting a print command for N-up printing of one or more document pages. In another example, the user may access the web portal by directly entering a URL address of the web portal in a web browser. In yet another example, the user may access the web portal using other web elements, such as widgets and web-enabled applications. Further, the web portal may present a user interface, such as a print dialogue box, or a graphical user interface (GUI).

The working of the multi-functional device 204 implemented in the network environment 200, is described in more detail with reference to FIG. 3.

Figure 3:
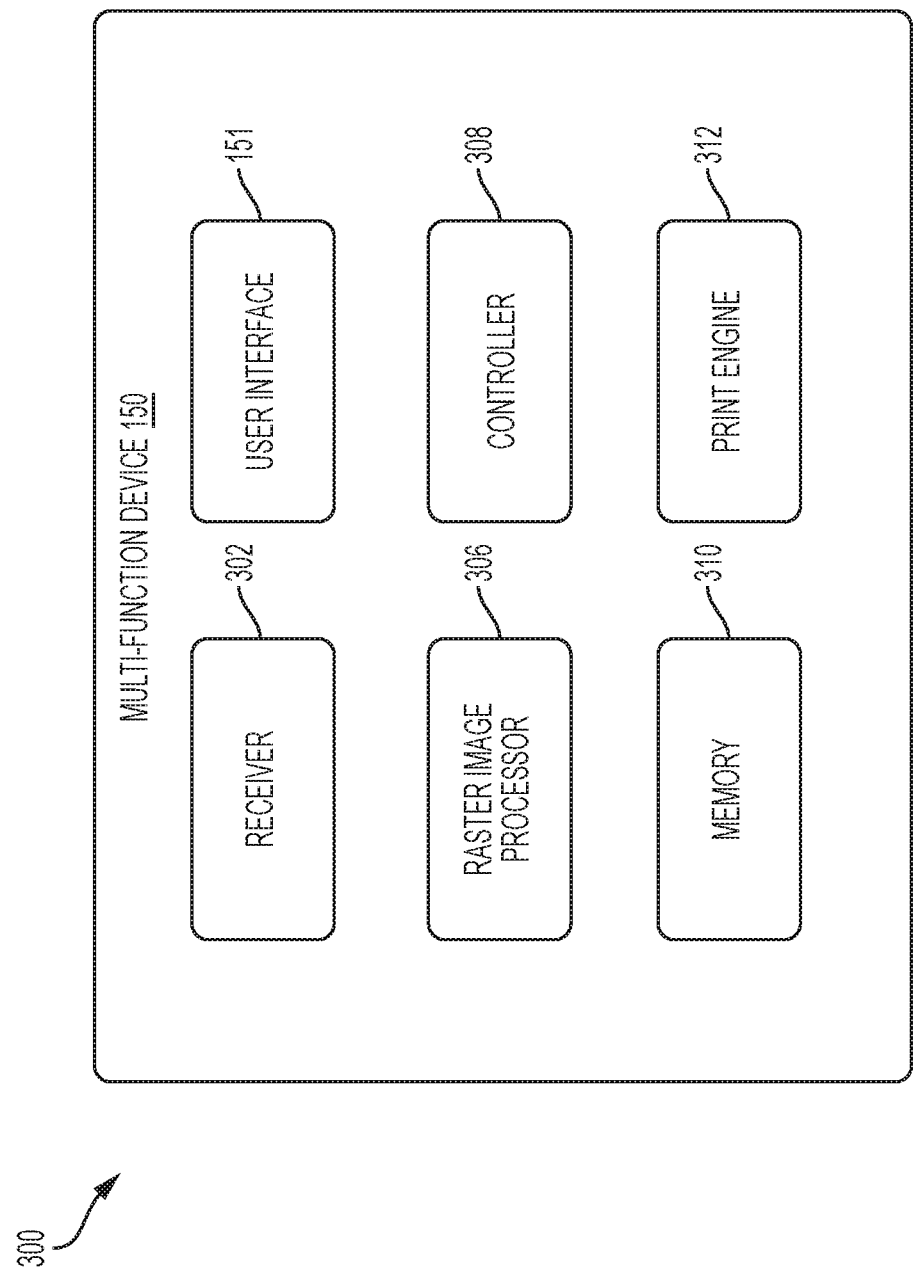
FIG. 3 illustrates various components of an exemplary multi-function device that can be utilized to implement one or more exemplary embodiments of the present disclosure.

FIG. 3 illustrates a block diagram 300 of a multi-functional device 150, in accordance with one example of the present disclosure. The multi-function device 150 alters an orientation of a logical cell based on a user's choice. As shown, the multi-functional device 150 includes a receiver 302, a user interface 151, a raster image processor 306, a controller 308, a memory 310 and a print engine 312. Each of the components 302, 151, 306, 308, 310 and 312 are coupled to each other via a communication bus or later developed protocols and each of the components 302-312 communicate with each other for altering an orientation of the logical cell as required by the user.

A user submits a job to the multi-function device 150 and further wishes to alter an orientation of a page in the corresponding logical cell.

In operation, the receiver 302 receives a job. The job includes a document having multiple pages and an initial instruction to arrange n number of pages on a single medium. The initial instruction represents information associated with N-up operation, each page has a pre-defined orientation. The job is in the form of page description language (PDL) document. In one example, all pages may have a landscape orientation. In another example, all pages may have a portrait orientation. In further example, some pages may have landscape orientation or while some pages may have portrait orientation. The PDL document supports many file types including without limitation such as .pdf, .doc, .docx, .ppt, .pptx, .ps and many more. The PDL document may include information about fonts, graphics, and the like that describe the appearance of the document present within the job and include a set of programming language commands for processing the document based on the information. The PDL document may further include N-up related instructions.

The user further selects a page requiring an orientation change. The receiver 302 receives a selection of the page requiring an orientation change and further receives another instruction to alter a pre-defined orientation of the selected page in the corresponding logical cell. The page selection can be performed via the user interface of the 151 of the multi-function device 150. Alternatively, the page selection can be provided as a part of the job. Similarly, the instruction to alter the orientation of the selected page is provided via the user interface of the 151 of the multi-function device 150. The instruction to alter the orientation of the selected page is provided as a part of the job. Further, the instruction to alter the orientation of the selected page includes page number of the page and orientation details. The orientation details include degree of rotation and direction of rotation.

Upon receiving all the required information, the receiver 302 passes the required information to the controller 308 for further processing. The required information includes the job, N-up related instructions, the page selected for orientation change and orientation details.

The input about the page can be provided via the user interface 151 of the multi-function device. The user interface 151 further allows the user to select the page and specify the required orientation details of the selected page. The user interface 151 can also provide page number of the page. The input about the page can be submitted as a part of the PDL job. In such cases the page number and the orientation details are provided as a part of the job. The receiver 302 receives the PDL job and the input about the page and is further passed to the controller 308 for further processing. The controller 308 receives the PDL job and input about the page, the input includes information/instructions associated with the N-up operation, and the page requiring the orientation change. The controller 308 passes the gathered instructions/information to the raster image processor (RIP) 306. Before passing the required information to the raster image processor (RIP) 306, the controller 308 puts the required information in a task dictionary and the task dictionary is passed to the RIP 306. The task dictionary may be in the form of a memory in which instructions/data specified by the user can be collated for utilization while performing N-up operation. Specifically, the task dictionary includes all information/inputs provided by the user. The controller 308 passes the document and the task dictionary to the RIP 306 for further processing.

Before processing or rasterization, the RIP 306 creates a Job Definition File (JDF) capturing all the user inputs (copied from the task dictionary) required for further processing. For example, the JDF includes N-up instructions, the orientation details and the page selected for orientation change. The JDF includes all attributes/summary of the job. The RIP 306 reads the JDF to further process the print job.

The RIP 306 has all the required information including the job, the-up instructions, the page selected and orientation details to further process the job. The RIP 306 decomposes the PDL document to obtain the input document data to be printed or copied. The RIP 306 starts accumulating pages for a particular logical surface. The RIP 306 then performs the N-up operation to arrange 'n' number of pages on a single medium, wherein each page arranged on the single medium represents a logical cell. For example, if the document has 4 pages and the user specifies 4-up operation. Then, 4 pages are arranged on corresponding logical cells of a single medium or a logical surface of the single medium. After performing the N-up operation, the RIP 306 outputs 4 logical cells arranged on a single medium such as logical cell 1, logical cell 2, logical 3 and logical cell 4. While performing N-up operation, the RIP 306 sets orientation of each logical cell according to the pre-defined orientation. The RIP 306 further identifies a logical cell corresponding to the selected page requiring an orientation change. While performing the N-up operation, the RIP 306 alters the pre-defined orientation of the identified logical cell corresponding to the page selected for orientation change. The RIP 306 alters the pre-defined orientation of the selected page in the corresponding logical cell. To alter the orientation of the identified logical cell, the RIP 306 rotates the identified logical cell based on the orientation details. After rotation operation, the RIP 306 may scale the logical cells a bit to ensure that they fit on the single medium. The RIP 306 sets orientation of remaining logical cells as per the pre-defined orientation. After altering the orientation, the RIP 306 performs rasterization on each logical cell to convert each logical cell into pixels format. The RIP 306 creates an N-up raster buffer of the job for later retrieval and/or use. The N-up raster buffer includes raster images (or pixels) of each logical cell. In one example, the N-up raster buffer includes pixel display values or pixel values arranged in raster format. Example of raster formats may include, but not limited to, JPEG, TIFF, RAW, PNG, GIF, BMP, PPM, PGM, PBM, XBM, ILBM, WBMP, and PNM. The N-up raster buffer that is generated by the RIP 306 is consumed by the print engine 312 at later stages.

The RIP 306 stores the N-up raster buffer for later retrieval and/or use in the memory 310. The RIP 306 finally converts each logical cell into read-to-print format and passes the ready-to-print format to the print engine 312 for printing.

The RIP 306 further generates tag and assigns tag to pixels of each logical cell. The tag helps identifying the particular logical cell. The tag can be considered an identifier to identify the logical cells based on their location in N-up. The N-up raster buffer is stored for later retrieval and use. In one example, the N-up raster buffer may be used for re-printing.

The RIP 306 additionally maps each logical cell with an original page of the print job based on one or more characteristics, but not limited to, raw format, size, shape, tag value, vertical resolution, horizontal resolution, or a combination thereof. In other words, the RIP 306 maps the 'n' number of pages to corresponding logical cells of the single print medium based on one or more characteristics as just discussed.

Before printing, the controller 308 communicates with the user interface 151 to display a preview of the logical cell with altered orientation and the remaining logical cells with respective pre-defined orientation.

The controller 308 then calls the print engine 312 for printing. The print engine 312 then converts the N-up raster buffer into a ready-to-print (RTP) format. The print engine 312 receives the ready-to-print format for printing. The print engine 312 finally prints the logical cells on the single medium. The print engine 312 prints the logical cell with the altered orientation and prints the remaining logical cells with respective pre-defined orientation. In case the N-up job is a copy job then the print engine 312 copies the logical cells on the single medium. The print engine 312 copies the logical cell with the altered orientation and copies the remaining logical cells with respective pre-defined orientation. In this manner, the orientation of the logical cell is altered before rasterization and printed/copied as per user's choice.

As shown, the user interface 151 allows the user to select a page or provide an input about a page requiring an orientation change in the corresponding logical cell. The user interface 151 further allows the user to provide orientation details such as degree of rotation and direction of rotation. The user interface 151 further displays a preview of the logical cell with altered orientation and the remaining logical cells with respective pre-defined orientation.

The memory 310 stores N-up raster buffer, fabricated N-up raster buffer, and other data relevant for the present disclosure. The memory 310 may further data generated as a result of functionalities implemented by any of the components of the multi-function device 150. The other data may include intermediate processing data related to image processing. The N-up raster buffer refers to a rasterized buffer of an N-up document, i.e., including pixel data corresponding to each logical cell. The fabricated raster buffer represents an edited rasterized buffer of N-up document including an altered orientation of a logical cell corresponding to a page that the user selects.

There can be scenarios where the user wishes to alter the orientation a logical cell at later stages. For example, the user may want to alter the orientation a logical cell when the N-up job is processed or printed already. In such cases, the user can retrieve the already stored N-up raster buffer at the multi-function device 150, i.e., RIP-ed content is already present with the multi-function device 150. The N-up raster buffer includes raster images (pixels) of all logical cells and further pixels falling under each logical cell are associated with a tag value. Each logical cell has a unique 8-bit tag value based on the imposed location. For example, the logical cell LC1 may have a tag value 11, logical cell LC2 may have a tag value 12, logical cell LC3 may have a tag value 21 and logical cell LC4 may have a tag value 22. In such cases, the RIP 306 retrieves the N-up raster buffer from the memory 310 of the multi-function device 150 and edits the N-up raster buffer when the user selects a logical cell for orientation change.

In such cases the controller 308 provides the user interface 151 to the user. The user interface 151 is provided to receive a selection of an N-up raster buffer corresponding to the document, the N-up raster buffer includes 'n' number of logical cells on single medium, wherein each logical cell is associated with a tag value and has a defined orientation. The user interface 151 displays the logical cells with the defined orientation, for preview and selection. The user interface 151 receives a selection of a logical cell for orientation change. The user interface 151 receives orientation details for the selected logical cell. The controller 308 receives all the input received via the user interface 151 to the RIP 306 for further processing.

Based on the received selection input, the RIP 306 copies content of the N-up raster buffer into a fabricated N-up raster buffer. Based on the tag value, the RIP 306 identifies pixels corresponding to the logical cell selected by the user. After copying the content into the fabricated N-up raster buffer, the RIP 306 alters the orientation of the selected logical cell. The RIP 306 modifies the fabricated raster buffer in such a way that the pixels of the selected logical cell are rotated, while the pixel of remaining logical cells remain as it is. The term fabricated N-up raster buffer represents an edited raster buffer having the selected logical cell with altered orientation based on user' choice and remaining logical cells with defined orientation. In this manner, the RIP 306 updates the N-up raster buffer by altering the orientation of the selected logical cell.

The RIP 306 stores the updated/edited N-up raster buffer including the selected logical cell with altered orientation and the remaining logical cells with the defined orientation, for later retrieval and/or use. The RIP 306 passes the edited N-up raster buffer to the print engine 312 for printing. The print engine 312 prints the edited N-up raster buffer by printing the selected logical cell with the altered orientation and printing the remaining logical cells with the defined orientation. The RIP 306 passes the edited N-up raster buffer to the controller 308 for display. The controller 308 interacts with the user interface 151 to display the updated N-up raster buffer by displaying the selected logical cell with the altered orientation and displaying the remaining logical cells with the defined orientation. In this manner, the multi-function device 150 alters orientation of the logical cell even if the job is processed already.

As discussed above, the N-up raster buffer is of the same job submitted by the user. But it is understood that the multi-function device 150 stores N-up raster buffers corresponding to other jobs and the user may select any of the stored N-up raster buffers. Further, the logical cell selected for orientation change may be a different logical cell than just discussed above. But if it is the same logical cell, then the same logical cell may require further orientation change.

Referring to example shown in FIGS. 4A and 4B, if the user wants to modify the orientation of LC3 then the 4-up buffer is fabricated for the pixels that have position tag as 21. Based on the user specified orientation and the position tag, the portion of the 4-up buffer is rotated. The RIP 306 rotates the logical cell LC3 to 90 degrees at the right side.

Various examples of the orientation details are such as 90 degree clockwise (right), 90 degree anti-clockwise (left), 180 degree clockwise (right), 180 degree anti-clockwise (left), 270 degree clockwise (right), 270 degree anti-clockwise (left) and so on.

In this way, the modification of the logical cell at the multi-function device 150 can be performed by a user over the network so as to cater the emerging special requirements of customizing the orientations for various personal, business, or administrative implementations. In one example, the document is already present in a raster format in the N-up raster buffer at the multi-function device 150.

The multi-function device 150 may be implemented in the form of a digital front end (DFE) module, a digital rear end (DRE) module, and other module(s). The DFE module may include a raster image processor (RIP), and the DRE module may include a print engine. The functionalities of the raster image processor and the print engine remain the same as discussed above. The other modules(s) may implement functionalities that supplement applications or functions performed by the multi-functional device 150.

In some aspects, the multi-function device 150 may include one or more additional components such as one or more processor(s). The one or more processor(s) may be implemented as one or more microprocessors, microcomputers, microcontrollers, digital signal processors, central processing units, logic circuitries, and/or any devices that manipulate data based on operational instructions. Among other capabilities, the one or more processor(s) are configured to fetch and execute computer-readable instructions stored in the memory of the multi-functional device 150. The memory may store one or more computer-readable instructions or routines, which may be fetched and executed to create or share the data units over a network service. The memory may include any non-transitory storage device including, for example, volatile memory such as RAM, or non-volatile memory such as EPROM, flash memory, and the like.

The processors may be implemented as a combination of hardware and programming (for example, programmable instructions) to implement one or more functionalities of the processors. In examples described herein, such combinations of hardware and programming may be implemented in several different ways. For example, the programming for the processors may execute instructions stored on a non-transitory machine-readable storage medium and the hardware for the processors may include a processing resource (e.g., one or more processors), to execute such instructions. In the present examples, the machine-readable storage medium may store instructions that, when executed by the processing resource, implement the processing engine(s). In such examples, the multi-functional device 150 may include the machine-readable storage medium storing the instructions and the processing resource to execute the instructions, or the machine-readable storage medium may be separate but accessible to multi-functional device 150 and the processing resource. In other examples, the processors may be implemented by electronic circuitry.

Exemplary Flowcharts

Changing Orientation of a Logical Cell Before Rasterization

Figure 5:
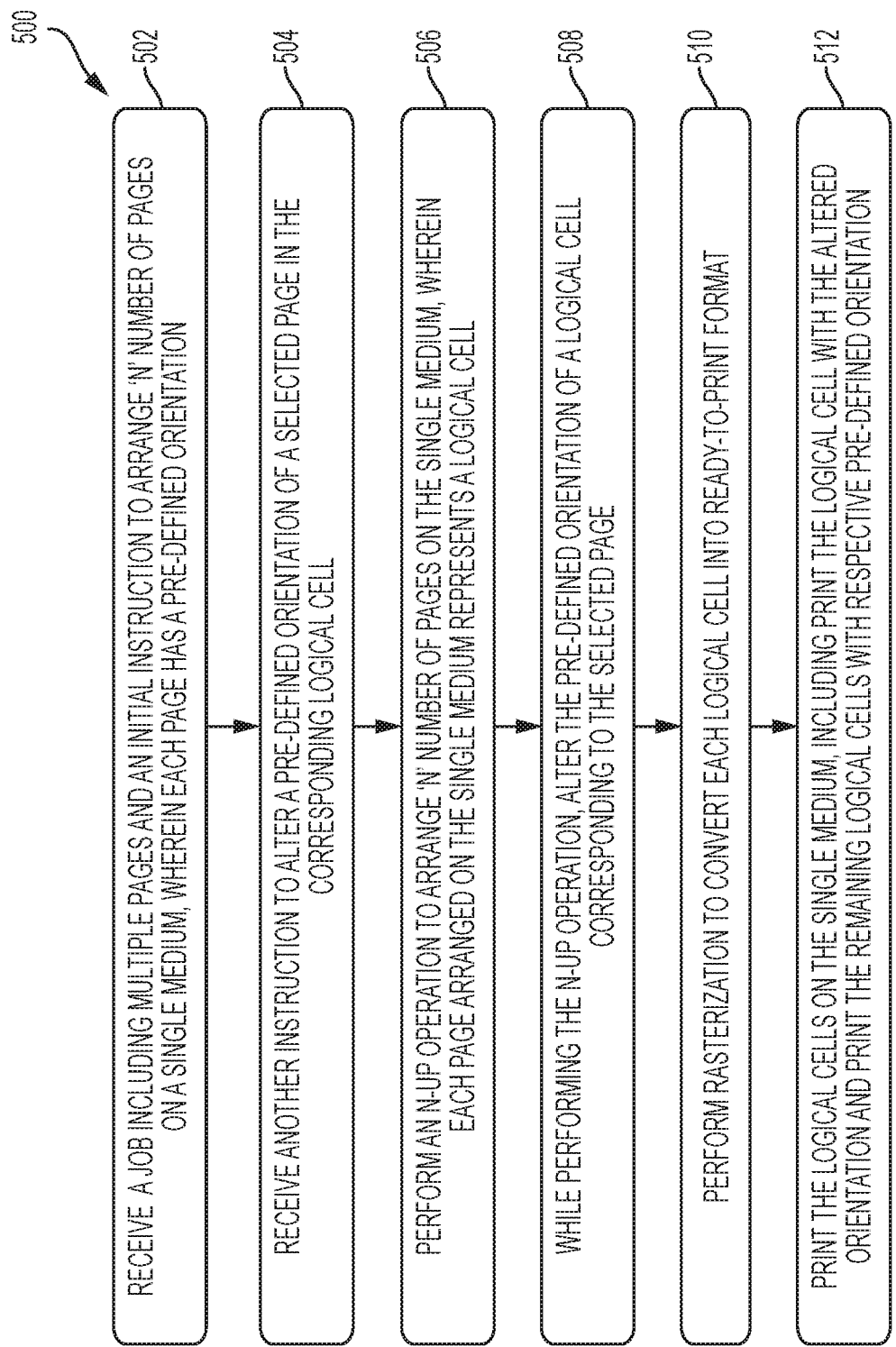
FIG. 5 is a method for logical cell based orientation in N-up copying or printing, according to an exemplary embodiment of the present disclosure.

A method flowchart 500 is described with reference to FIG. 5 for operating the multi-functional device 150, according to an example of the present subject matter. The method 500 is implemented when a document is to be processed in N-up mode and a user wishes to alter an orientation of one or more pages of the document (or logical cells of the N-up document). The method 500 discloses altering an orientation of a logical cell at the multi-functional device 150. The method flowchart 500 focuses on altering orientation of the logical cell before rasterization. According to the method 500, orientation of the logical cell is altered before rasterization and a user can provide an input or instruction to alter the orientation any time after submitting the job but before rasterization is performed by the multi-function device 150.

The order in which the method 500 is described is not intended to be construed as a limitation, and any number of the described method blocks can be combined in any appropriate order to carry out the method 500, or alternative methods. Reference to other figures can be made while discussing the method 500. The method 500 can be performed the multi-function device 150 or by any of its components such as a raster image processor 306. The method 500 can be implemented by the multi-function device 150 or an equivalent device, taking inputs from a user when required. The method 500 can be performed by programmed computing devices, for example, based on instructions retrieved from the non-transitory computer-readable medium or non-transitory computer-readable media. The computer-readable media can include machine-executable or computer-executable instructions to perform all or portions of the described method. The computer-readable media may be, for example, digital memories, magnetic storage media, such as magnetic disks and magnetic tapes, hard drives, or optically readable data storage media.

The method begins when a user submits a job to the multi-function device 150. At block 502, a job is received. The job includes a document having multiple pages and an initial instruction to arrange 'n' number of pages on a single medium. The job may be an N-up print job or the job may be an N-up copy job. The job can be in the form of a PDL document and includes an initial instruction to arrange 'n' number of document pages on corresponding logical cells of a single medium. Each page has a pre-defined orientation such as a vertical (portrait) orientation or a horizontal (landscape) orientation. In some cases, each page may have the same orientation, may have a different orientation or may have a combination thereof.

The user then selects a page whose orientation needs to be altered. The page can be selected via a user interface or can be submitted as a part of the job. After receiving the job, at 504, another instruction to alter a pre-defined orientation of the selected page in the corresponding logical cell is received. The instruction to alter the pre-defined orientation of the selected page includes page number and orientation details such as a direction of rotation and a degree of rotation. The instruction to alter the pre-defined orientation of the selected page can be submitted as a part of the job. In such implementations, the job can include the page requiring an orientation change and orientation details. For example, the user can mention the page number of a page for which he wishes to change the orientation and further specifies the degree of orientation such as 90 degree and a clock-wise direction. In some cases, the instruction can be provided via a user interface of the multi-function device 150. Through the user interface, the user selects the page or can provide the page number and further specifies the required orientation of the selected page. In some implementations, the user provided input is put in a task dictionary (not shown in figures) and the same input is passed for further processing. Before processing, a Job Definition File (JDF) is created capturing the user inputs (copied from the task dictionary) and the JDF is processed by the multi-function device 150 or the raster image processor 306.

The job definition file is read, and the input is retrieved for further processing. After all the required data (i.e., the document, the N-up instructions, the selected page, instructions to alter the pre-defined orientation of the selected page, and the orientation details), is received, the job is processed further. Based on the initial instruction in the job, at 506, N-up operation is performed to arrange 'n' number of pages on a single medium. Each page arranged on the single medium represents a logical cell. The logical cells are represented in the same pre-defined orientation as in the job. Each logical cell represents an image of the page.

While performing N-up, a logical cell corresponding to the page selected by the user, is identified. Upon identification, at 508, while performing the N-up operation, the pre-defined orientation of the identified logical cell corresponding to the selected page, is altered. Here, altering the orientation of the identified logical cell includes rotating the logical cell according to received orientation details such as degree of rotation and direction of rotation. After altering, a preview of the logical cell with altered orientation and the remaining logical cells with respective pre-defined orientation is displayed, via a user interface.

At 510, rasterization is performed to convert each logical cell into rasterized format such as pixels and N-up raster buffer is ready. The rasterized format is then converted into ready-to-print format. Then, a tag value is generated and assigned to pixels of/for each logical cell. The tag can be an 8-bit tag that includes a value that identifies the corresponding logical cell and the tag value is assigned based on its location in the N-up. For example, in a 4-up document the tags can be 11, 12, 21, and 22, where the first position representing the column number of the logical cell in the N-up document and the second position representing the row number of the logical cell in the N-up document. The N-up raster buffer is stored with the assigned tag value to pixels of each logical cell. The N-up raster buffer is stored or saved for later retrieval and/or use. The N-up raster buffer includes rasterized data/raster images of each logical cell. The N-up raster buffer with the altered orientation is stored for later retrieval and use such as reprinting or recopying the document with the altered orientation of the logical cell. In some cases, the N-up raster buffer is edited when the user further wishes to alter orientation of a further logical cell.

Finally, at 512, the logical cells are printed on the single medium. The printing includes printing the logical cell with the altered orientation and printing the remaining logical cells with respective pre-defined orientation. Before printing, the logical cells are scaled appropriately so that the logical cells fit adequately on single medium. In this manner, the orientation of the logical cell is changed in the printed version. In cases the job is an N-up copy job, the logical cells are copied on a single medium such that the logical cell with the altered orientation is copied and the remaining logical cells are copied with respective pre-defined orientation on a single medium.

Changing Orientation of a Logical Cell after Rasterization

Figure 6:
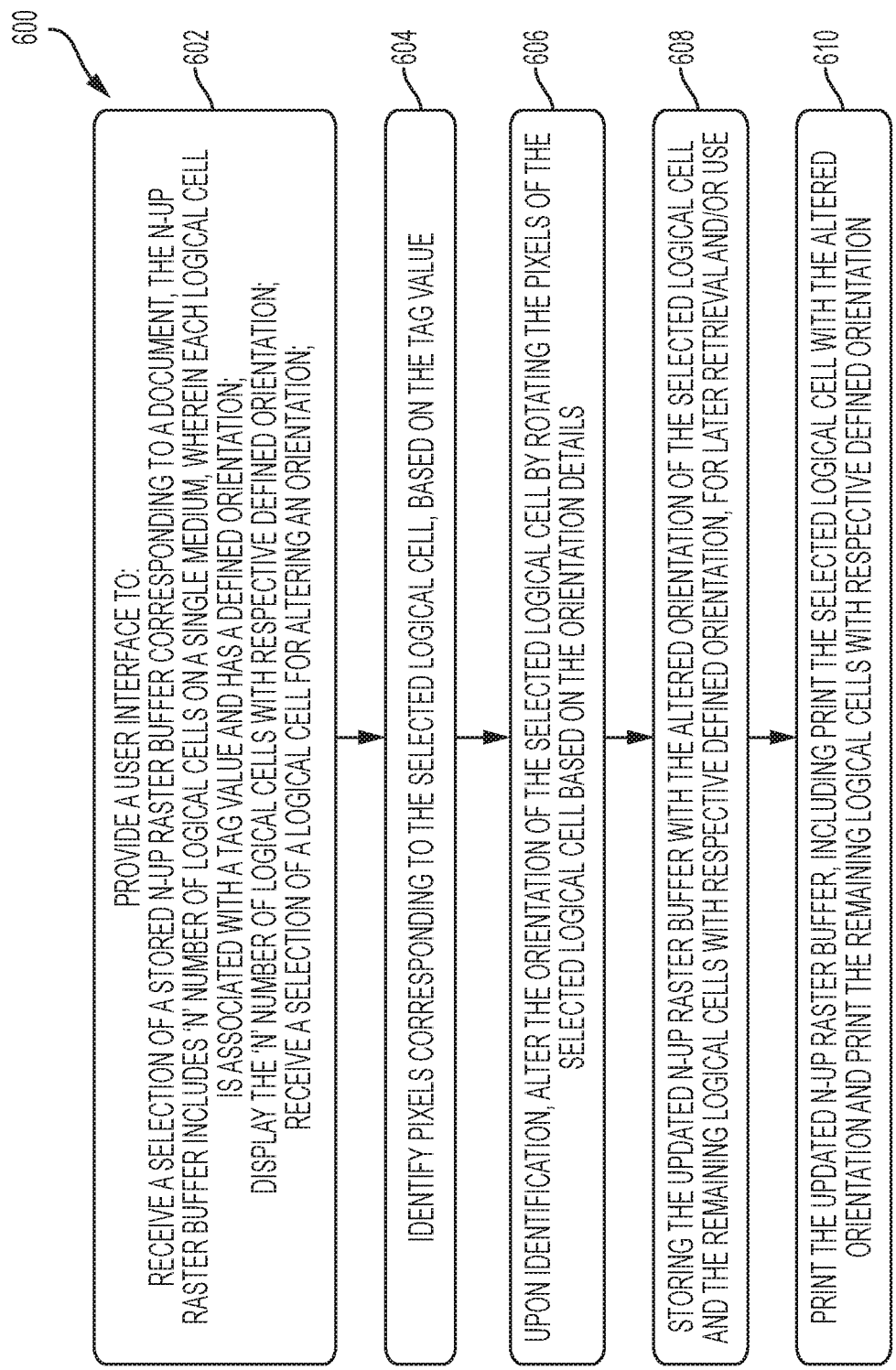
FIG. 6 is another method for logical cell based orientation in N-up copying or printing.

FIG. 6 is a flowchart 600 for changing orientation of a logical cell after rasterization. The method 600 is implemented when an N-up raster buffer of a document is already present with the multi-function device 150 and a user wishes to alter an orientation of one or more logical cells. The method 600 alters orientation of the one or more logical cells even if the rasterization is performed. The method flowchart 600 focuses on changing orientation of the logical cells after rasterization is performed. According to the method flowchart 600, orientation of the logical cell is changed after rasterization and a user can provide an instruction about the orientation change after rasterization is performed by the multi-function device 150.

The method initiates when a user wishes to change an orientation of a logical cell at the multi-function device 150. The user approaches the multi-function device 150 to operate the multi-function device 150. In such cases, the already created and stored raster buffer is edited/refabricated, depending on the user requirement.

At 602, a user interface is provided to the user. The user interface is provided to receive a selection of a document stored at the multi-function device. The N-up raster buffer corresponding to the document is selected and provided to the user. The N-up raster buffer includes n number of logical cells (corresponding to each page of the document) arranged on a single medium, wherein each logical cell is associated with a tag value and has a defined orientation. Upon selection, the 'n' number of logical cells are displayed with respective orientation. The user selects a logical cell for which he wishes to alter an orientation. A selection of the logical cell is received. Then, the orientation details for the selected logical cell are provided.

Once all the details are provided via the user interface, the user provided inputs are put in a task dictionary (not shown in figures) and the same input is passed to the raster imager processor 306 for further processing. Before processing, a Job Definition File (JDF) is created capturing the user inputs (copied from the task dictionary) and the job definition file is processed by the raster image processor 306.

Upon receiving the user provided input, pixels corresponding to the logical cell selected by the user are identified at 604. The pixels of the selected logical cell are identified based on the tag value. Upon identification, at 606, the orientation of the selected logical cell is altered by rotating pixels of the selected logical cell based on the orientation details. Here, pixels only for the identified logical cell are rotated. The N-up raster buffer is updated/edited by altering the orientation of the selected logical cell. At 608, the updated/edited N-up raster buffer is stored with the altered orientation of the selected logical cell and the remaining logical cells with the respective defined orientation, for later retrieval and/or use such as printing or display. Once the orientation is altered, the logical cells are formatted appropriately and processed for printing and/or copying.

In case of printing, the updated/edited N-up raster buffer is printed by printing the selected logical cell with the altered orientation and printing the remaining logical cells with the defined orientation at 610. In case of copying, the updated/edited N-up raster buffer is copied by copying the selected logical cell with the altered orientation and copying the remaining logical cells with the defined orientation.

In case of displaying, the edited N-up raster buffer is displayed to the user by displaying the selected logical cell with the altered orientation and displaying the remaining logical cells with the respective defined orientation.

Thus, with the implementation of the method 500 or 600 of the present subject matter, the user is able to alter or modify the orientation of the logical cells, before the raster image processing of the job as well as after raster image processing of the job.

It must be noted that when an orientation is altered, the orientation of a logical cell is altered in both case scenarios—"before rasterization" and "after rasterization" case scenario. In before rasterization cases, a PDL job is available and the user selects or provides a physical page whose orientation need to be changed. The methods and systems identify a logical cell corresponding to the selected page and alter orientation of the identified logical cell. In other words, the methods and systems alter the orientation of the selected page in the corresponding logical cell. Post altering the orientation of the identified logical cell, rasterization is performed.

In after rasterization cases, N-up raster buffer is available and logical cells are available for the selection. The user selects or provides a logical cell whose orientation needs to be changed. The user can select the logical cell via a user interface. The methods and systems identify pixels belonging to the input logical cell and rotate the identified pixels of the logical cell. In this manner, the orientation of the input logical cell is altered.

The present disclosure is implemented when a user wishes to alter an orientation of a logical cell. For example, the alteration may be required when a logical cell is oriented different than remaining logical cells. In another example, the alteration may be required when content present in a logical cell is rotated due to various reasons. These are just few examples, alteration to the logical cells can be performed as desired.

The method 500 and 600 is implemented in the form of non-transitory computer-readable medium. A non-transitory computer-readable medium implementing the subject matter includes instructions executable by a processing resource. The instructions are executed to receive a job including multiple pages and an initial instruction to arrange 'n' number of pages on a single medium, wherein each page has a pre-defined orientation. The instructions are executed to receive another instruction to alter a pre-defined orientation of a selected page in the corresponding logical cell. The instructions are executed to perform an N-up operation to arrange 'n' number of pages on the single medium, wherein each page arranged on the single medium represents a logical cell. The instructions are executed to while performing the N-up operation, altering the pre-defined orientation of a logical cell corresponding to the selected page. The instructions are executed to perform rasterization to convert each logical cell into ready-to-print format. Finally, the instructions are executed to print the logical cells on the single medium, comprising printing the logical cell with the altered orientation and printing the remaining logical cells with respective pre-defined orientation on the single medium.

A non-transitory computer-readable medium implementing the subject matter includes instructions executable by a processing resource. The instructions are executed to providing a user interface to receive a selection of a stored N-up raster buffer corresponding to a document, the N-up raster buffer comprising 'n' number of logical cells on a single medium, wherein each logical cell is associated with a tag value and has a defined orientation; display the 'n' number of logical cells with respective defined orientation; receive a selection of a logical cell for altering an orientation; receive orientation details for the selected logical cell. The instructions are executed to identify pixels corresponding to the selected logical cell, based on the tag value. The instructions are executed to upon identification, alter the orientation of the selected logical cell by rotating the pixels of the selected logical cell based on the orientation details. The instructions are executed to store the updated N-up raster buffer with the altered orientation of the selected logical cell and the remaining logical cells with respective defined orientation, for later retrieval and/or use. The instructions are executed to print the updated N-up raster buffer, comprising printing the selected logical cell with the altered orientation and printing the remaining logical cells with respective defined orientation on the single medium.

Exemplary Scenario

For easy understanding, an example is considered. It can be considered that an N-up print job is received from a user. The N-up print includes a document having multiple pages such as eight in this case. All eight pages have a pre-defined orientation such as landscape orientation. The document includes all instructions to be processed according to N-up operation. The user further wants to change an orientation of a page say page 3 of the document. To this end, the user selects the page 3 via a user interface and further provides orientation details such as angle, direction and other relevant details required for changing orientation of the selected page. The raster image processor the job and information as discussed above in detail. The raster image processor arranges these 8 pages on 2 single sheets such as papers. Each logical cell can be defined as LC1, LC2, LC3, LC4, LC5, LC6, LC7 and LC8. All pixels belonging to the logical cell 1 may be labelled as 11, all pixels under logical cell 2 may be labelled as 12, all pixels under logical cell 3 may be labelled as 21 and all pixels under logical cell 4 may be termed as 22. Tags are assigned corresponding to each logical cell as 11, 12, 13, 14, 21, 22, 23 and 24, respectively. While processing, the raster image processor changes the orientation of the LC3 according to the user specified orientation. Thereafter, the raster processor passes the data to print engine for printing. The print engine prints the logical cells LC1-LC4 on a single sheet with modified orientation for the logical cell 3 and remaining cells LC1, LC2 and LC4 are printed on the single sheet with the same orientation as per the received input. Similarly, the print engine prints the logical cells LC5-LC8 on another single sheet with the same orientation as per the received input.

The present disclosure discloses methods and systems for altering orientation of one or more logical cells in N-up copying or printing. The methods and systems alter orientation of the one or more logical cells while performing N-up, i.e., before rasterization. The methods and systems alter orientation of the one or more logical cells of the already rasterized N-up buffer, i.e., post rasterization. The present disclosure discloses methods and systems for logical cell-based orientation in N-up copying or printing operation. The methods and systems display logical cells for selections via a user interface and further allow the user to rotate the logical cells to an alternate orientation. The methods and systems allow a user to specify the orientation via a user interface of a multi-function device or as a part of the job and thus, facilitates an easy mechanism of specifying the orientation change. The methods and systems further include a way to rotate more than one logical cell at a time. The methods and systems additionally include a way to determine which logical cells to scale, i.e., the rotated logical cells or the non-rotated logical cells. The methods and systems further allow the user to move any of the logical cells (rotated or not) from one page to another page. In such cases case, pagination is performed automatic, and the user gets more control over his/her printed output. The methods and systems provide more control over his/her job and thereby the disclosure is very useful for users. Moreover, the disclosure is easy to implement and thus, offers simplicity. The disclosure could be extended to add individual image size control.

Further, the present subject matter is disclosed herein with reference to a server-client architecture; however, the subject matter is equally applicable to multi-functional devices implemented in multi-functional devices, such as printers, copiers, and the like, which are in direct communication with the user devices.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the disclosure, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "copying," or "altering," or "printing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for altering an orientation of a logical cell at a multi-function device, the method comprising:
receiving a job comprising multiple pages and an initial instruction to arrange 'n' number of pages on a single medium, wherein each page has a pre-defined orientation;
receiving another instruction to alter a pre-defined orientation of a selected page in the corresponding logical cell;
performing an N-up operation to arrange the 'n' number of pages on the single medium, wherein each page arranged on the single medium represents a logical cell;

while performing the N-up operation, altering the pre-defined orientation of a logical cell corresponding to the selected page;

performing rasterization to convert each logical cell into ready-to-print format;

assigning a tag value to pixels of each logical cell based on a location of the corresponding logical cell in the job, wherein the tag value identifies the corresponding logical cell; and printing logical cells on the single medium, wherein the logical cell with the altered orientation and the remaining logical cells with respective pre-defined orientations are printed on the single medium.

2. The method of claim 1, wherein the instruction to alter the orientation of the selected page is provided via a user interface of the multi-function device.

3. The method of claim 1, wherein the instruction to alter the orientation of the selected page is provided as a part of the job.

4. The method of claim 1, wherein the instruction to alter the orientation of the selected page includes a page number of the selected page and orientation details thereof.

5. The method of claim 4, wherein the orientation details comprise a degree of rotation and a direction of rotation.

6. The method of claim 1, further comprising identifying the logical cell corresponding to the selected page.

7. The method of claim 1, further comprising rotating the logical cell corresponding to the selected page.

8. The method of claim 1, further comprising converting each logical cell into pixels.

9. The method of claim 1, further comprising displaying a preview of the logical cell with the altered orientation and the remaining logical cells with respective pre-defined orientation, via a user interface.

10. The method of claim 1, further comprising storing an N-up raster buffer of the job, for later retrieval and/or use.

11. The method of claim 10, further comprising editing the N-up raster buffer of the job only for a further selected logical cell.

12. The method of claim 1, further comprising copying the logical cells on the single medium, wherein the step of copying further comprises copying the logical cell with the altered orientation and copying the remaining logical cells with the respective pre-defined orientation.

13. A method for altering an orientation of a logical cell at a multi-function device, the method comprising:

providing a user interface configured to:
receive a selection of a stored N-up raster buffer corresponding to a document, the N-up raster buffer comprising 'n' number of logical cells on a single medium, wherein each logical cell is associated with a tag value and has a defined orientation, wherein the tag value is associated with pixels of each logical cell based on a location of the corresponding logical cell in the job;

display the 'n' number of logical cells with respective defined orientations;

receive a selection of a logical cell for altering an orientation; and receive orientation details for the selected logical cell;

identifying pixels corresponding to the selected logical cell, based on the respective tag value;

upon identification, altering the orientation of the selected logical cell by rotating the pixels of the selected logical cell based on the orientation details;

storing the updated N-up raster buffer with the altered orientation of the selected logical cell and the remaining logical cells with respective defined orientation, for later retrieval and/or use; and printing the updated N-up raster buffer including the selected logical cell with the altered orientation and the remaining logical cells with respective defined orientation on the single medium.

14. The method of claim 13, wherein the step of altering further comprises editing the N-up raster buffer by altering the orientation of the selected logical cell.

15. The method of claim 13, further comprising displaying the updated N-up raster buffer including the selected logical cell with the altered orientation and the remaining logical cells with the respective defined orientation.

16. A system comprising:

a multi-function device configured for:
receiving a job comprising multiple pages and an initial instruction to arrange 'n' number of pages on a single medium, wherein each page has a pre-defined orientation; and receiving another instruction to alter a pre-defined orientation of a selected page in the corresponding logical cell;

a raster image processor in communication with the multi-function device, the raster image processor being configured for:
performing an N-up operation to arrange the 'n' number of pages on the single medium, wherein each page arranged on the single medium represents a logical cell;

while performing the N-up operation, altering the pre-defined orientation of a logical cell corresponding to the selected page;

performing rasterization to convert each logical cell into ready-to-print format; and assigning a tag value to pixels of each logical cell based on a location of the corresponding logical cell in the job, wherein the tag value identifies the corresponding logical cell; and a print engine in communication with the raster image processor, the print engine being configured for printing logical cells on the single medium, wherein the print engine prints the logical cell with the altered orientation and the remaining logical cells with respective pre-defined orientation.

17. The system of claim 16, wherein the instruction to alter the pre-defined orientation of the selected page is provided via a user interface of the multi-function device.

18. The system of claim 16, wherein the instruction to alter the pre-defined orientation of the selected page is provided as a part of the job.

19. The system of claim 16, wherein the instruction to alter the pre-defined orientation of the selected page comprises a page number of the selected page and orientation details thereof.

20. The system of claim 19, wherein the orientation details comprise a degree of rotation and a direction of rotation.

21. The system of claim 16, wherein the raster image processor is further configured for identifying the logical cell corresponding to the selected page.

22. The system of claim 16, wherein the raster image processor is further configured for rotating the logical cell corresponding to the selected page.

23. The system of claim 16, wherein the raster image processor is further configured for converting each logical cell into pixels.

24. The system of claim 16, further comprising a user interface configured for displaying a preview of the logical cell with the altered orientation and the remaining logical cells with respective pre-defined orientation.

25. The system of claim 16, further comprising a memory for storing an N-up raster buffer of the job, for later retrieval and/or use.

26. The system of claim 25, wherein the raster image processor is further configured for editing the N-up raster buffer only for a further selected logical cell.

27. The system of claim 16, wherein the print engine is further configured for copying the logical cells on the single medium, wherein the print engine copies the logical cell with the altered orientation and the remaining logical cells with respective pre-defined orientation.

28. A multi-function device, comprising:
a user interface configured for:
receiving a selection of a stored N-up raster buffer corresponding to a document, the N-up raster buffer comprising 'n' number of logical cells on a single medium, wherein each logical cell is associated with a tag value and has a defined orientation, wherein the tag value is associated with pixels of each logical cell based on a location of the corresponding logical cell in the job;
displaying the 'n' number of logical cells with respective defined orientations;
receiving a selection of a logical cell for altering an orientation; and
receiving orientation details for the selected logical cell;
a raster image processor configured for:
identifying pixels corresponding to the selected logical cell, based on the respective tag value; and
upon identification, altering an orientation of the selected logical cell by rotating the identified pixels corresponding to the selected logical cell based on the orientation details; and
a print engine configured for printing the selected logical cell with the altered orientation and printing the remaining logical cells with respective defined orientations.

29. The multi-function device of claim 28, wherein the raster image processor is further configured for updating the N-up raster buffer by altering the orientation of the selected logical cell.

30. The multi-function device of claim 29, wherein the user interface is further configured for displaying the updated N-up raster buffer, wherein the user interface displays the selected logical cell with the altered orientation and the remaining logical cells with respective defined orientation.

31. The multi-function device of claim 29, further comprising a memory for storing the updated N-up raster buffer comprising the logical cell selected by the user with the altered orientation and the remaining logical cells with the defined orientation, for later retrieval and/or use.

\* \* \* \* \*